United States Patent [19]

Hamano

[11] Patent Number: 4,507,565
[45] Date of Patent: Mar. 26, 1985

[54] METHOD FOR STARTING AN ELECTRIC STARTING MOTOR ADAPTED FOR STARTING AN INTERNAL COMBUSTION ENGINE

[75] Inventor: Isao Hamano, Himeji, Japan

[73] Assignee: Mitsubishi Denki Kabushiki Kaisha, Japan

[21] Appl. No.: 494,074

[22] Filed: May 12, 1983

[30] Foreign Application Priority Data

May 20, 1982 [JP] Japan .................. 55-87081

[51] Int. Cl.³ .............................. F02N 11/00
[52] U.S. Cl. .................. 290/38 R; 290/38 B; 290/46; 290/48; 310/229; 310/230; 318/361; 318/429
[58] Field of Search ............... 290/38 A, 38 B, 38 C, 290/38 E, 38 R, DIG. 1, 46, 48; 310/229, 230, 233, 239, 240, 241, 242, 244, 245, 248; 318/429, 360, 361

[56] References Cited

U.S. PATENT DOCUMENTS

| 1,526,613 | 2/1925 | Stephenson | 318/361 |
| 2,058,339 | 10/1936 | Metzger | 171/223 |
| 3,422,334 | 1/1969 | Jastrzembski | 318/361 X |
| 3,557,325 | 1/1971 | Hansen | 310/230 X |
| 3,577,002 | 5/1971 | Hall | 290/46 |
| 3,903,442 | 9/1975 | Krulls | 310/229 |
| 4,095,155 | 6/1978 | Brooks et al. | 310/230 X |

FOREIGN PATENT DOCUMENTS

| 0396793 | 1/1974 | U.S.S.R. | 310/229 |
| 0714581 | 2/1980 | U.S.S.R. | 310/229 |

Primary Examiner—William M. Shoop
Assistant Examiner—Paul Shik Lyen Ip
Attorney, Agent, or Firm—Leydig, Voit, Osann, Mayer and Holt

[57] ABSTRACT

Described is a method of starting an electric starting motor for an internal combustion engine. The motor shaft has a pinion at the shaft end for meshing with a ring gear provided to the engine. The pinion is shifted by a shift lever into a position meshing with the ring gear, after which the starting motor is excited for causing rotation of the ring gear and thereby starting the engine. According to the invention, until the time the pinion engages the ring gear, brush means of the starting motor are shifted away from the electrically neutral axis towards pole sides of the permanent magnet of the motor where the main magnetic field produced by the magnet is strengthened by the armature-reaction magnetic fluxes. After the pinion is engaged with the ring gear, said brush means are returned again to their positions on said neutral axis.

4 Claims, 4 Drawing Figures

METHOD FOR STARTING AN ELECTRIC STARTING MOTOR ADAPTED FOR STARTING AN INTERNAL COMBUSTION ENGINE

BACKGROUND OF THE INVENTION

This invention relates to a method of starting a starting electric motor used for starting an internal combustion engine and, more particularly, to a method of starting a magnet type of starting motor.

In general, for starting an internal combustion engine such as utilized in automotive vehicles, a starting electric motor such as battery-driven permanent magnet type D.C. motor is used. The motor is made up of a cylindrical yoke, a permanent magnet secured to the inner peripheral surface of the yoke, an armature mounted in said yoke in a facing relation to said permanent magnet and provided with an armature winding, a commutator mounted on a rotary shaft provided on said armature and electrically connected to said armature winding, brush means slidingly contacting the peripheral surface of said commutator and supplying current to said armature winding, an overrunning clutch engaged with and movable axially of said armature and a pinion operatively associated with one side of said overrunning clutch.

When the starting motor is driven to rotate, the pinion mounted on the output shaft of the motor through the medium of the overrunning clutch is set into rotation and the internal combustion engine is started upon actuation of a shift lever whereby the pinion is brought into mesh with a starting ring gear provided on the engine.

In conventional starting motors, positive and negative brushes are stationarily mounted within the motor housing or yoke so that, when an exciting current is supplied to the armature winding, the slide contact points of the brushes are situated on a mechanical neutral point and an electrical neutral axis, this brush position being most preferred theoretically in order that a maximum electric output may be developed by the starting electric motor.

With the above construction of the conventional starting motor, a rush current flows through the armature at the instant the pinion is engaged with the ring gear. The result is that a sudden impact load is produced in the torque transmission system. In effect, the pinion is engaged with the ring gear while the latter is stationary, and the rotational speed of the starting motor is increased from zero speed with the pinion. Thus the rush current flows through the armature winding depending on the characteristics of the starting D.C. motor. As a result, the maximum rush current flows at the instant the pinion is engaged with the ring gear so that the generated magnetic flux in the armature winding and through the permanent magnet are in the reverse direction to the main magnetic path in accordance with the right-hand rule. In this manner, the magnetic field of the permanent magnet tends to be weakened through demagnetization.

SUMMARY OF THE INVENTION

It is an object of the present invention to provide a novel method of starting a starting electric motor whereby the effect of demagnetization of the permanent magnet at the time of starting may be reduced.

It is another object of the present invention to provide a method of starting a starting electric motor according to which, during the starting time when the rush current flows through the armature winding, the brush position is shifted away from the electrically neutral axis and towards pole sides of the permanent magnet where the main magnetic field produced by said permanent magnet is strengthened by armature-reaction magnetic fluxes and, after said pinion is engaged with the ring gear, the brush position is returned to the electrical neutral axis for reducing the strength of the demagnetizing field caused by the armature reaction.

According to the present invention, the slide contact points of the positive and negative brushes with the commutator are biased from the electrically neutral axis during the starting time of the starting motor. In this position, the exciting current is supplied to the armature of the starting motor. After the lapse of the start time interval, the brushes are again shifted towards the electrical neutral axis and the exciting current is supplied continuously with the brushes remaining in this position. The result is that the engine may be started smoothly and the armature-reaction flux due to such rush currents may be suppressed at the time of starting of the starting electric motor. In addition, the force of impact caused by the pinion meshing with the ring gear may be reduced because the output of the starting motor is reduced on account of the biased position of the brushes during the time of starting of the starting motor. The result is that smooth starting characteristics of the engine may be obtained and the damage to the pinion and the starting ring gear through impact or friction may be reduced drastically.

DESCRIPTION OF THE PREFERRED EMBODIMENT

Figure 1:
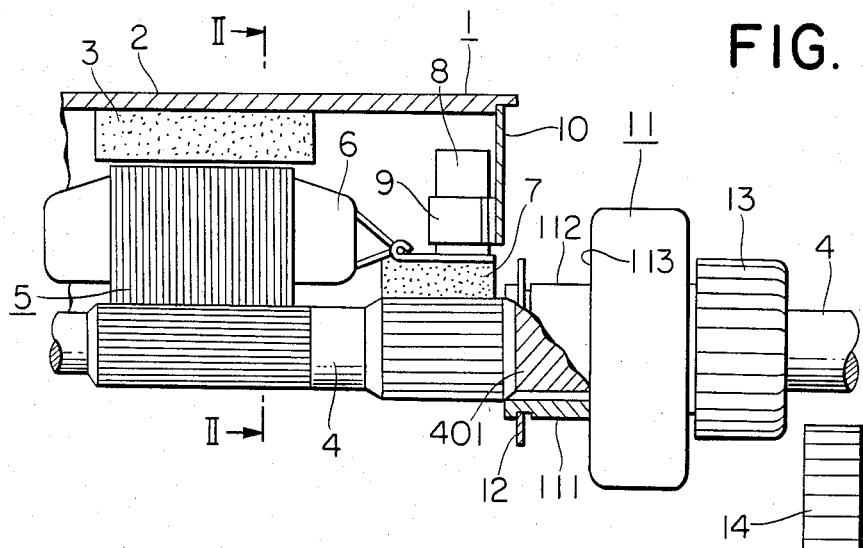
FIG. 1 is a side elevation, shown partly in section, of a starting electric motor to which the present invention is applied.

Referring to FIG. 1, a starting electric motor 1 is a permanent magnet D.C. electric motor and is composed of the following components. A yoke 2 is formed of a soft steel plate press-worked into a cylinder and providing a magnetic flux path. A permanent magnet 3 is made e.g. of ferrite and bonded to the inner peripheral surface of the yoke 2. The permanent magnet and the yoke constitute a field assembly. A rotary shaft 4 is mounted in the central axis of the yoke 2 and is allowed to rotate in the yoke 2 by bearing means not shown. An armature 5 is formed integrally with the rotary shaft 4 and is disposed in the yoke 2 for facing to the permanent magnet 3. An armature winding 6 is provided on the armature 5. A commutator 7 is mounted on the rotary shaft 4 and connected electrically to the armature winding 6. Brushes 8 are kept in sliding contact with the outer peripheral surface of the commutator 7 for supplying electric current to the armature winding 6 from a battery, not shown. A brush holder 9 holds each brush 8 and is mounted to the yoke 2 through a brush base 10. The brush holder 9 is mounted so as to permit adjustment of slide contact points of the brushes 8 with respect to the commutator 7, as will be described later. An overrunning clutch 11 is splinedly connected with helical splines 401 provided on the rotary shaft 4 and is shifted towards the right in the drawing or towards the end of the shaft 4 by the operation of a shift lever, not shown. The clutch 11 has a housing portion 111 having a peripheral groove into which a washer 12 is engaged as shown. An engaging groove for the shift lever is defined by the washer 12, an outer peripheral surface of the housing portion 111 and by a side wall surface 113 of the overrunning clutch 111. A pinion 13 is operatively connected to the clutch 11 in such a manner that the pinion may be coupled rotationally with the clutch in one direction of rotation of the shaft 4 and may also be slidable axially on the shaft 4 towards the right in the drawing upon operation of the shift lever. The pinion 13 may be engaged with a starting ring gear provided on the engine upon rightward shifting of the pinion 13 for starting the engine.

In operation, when the current is supplied to the armature winding 6 through brushes 8 and the commutator 7 for exciting the armature 5, a magnetomotive force is generated in the field assembly consisting of the yoke 2 and the permanent magnet 3. When the shift lever, not shown, is shifted at this time towards the right, the overrunning clutch 11 is shifted on the helical splines 401 of the rotary shaft 4 towards the right in the drawing until the pinion 13 meshes with the ring gear 14. As a result, torque is transmitted from the armature 5 to the ring gear 14 through the helical splines 401, overrunning clutch 11 and the pinion 13 for starting the engine. When the pinion 13 is not engaged correctly with the ring gear 14 when brought into an end face contact therewith, the pinion 13 is further rotated a small angle under the torque of the armature 5 so that the pinion 13 is brought into a correct engaging relation with the ring gear 14. After starting of the engine, the pinion 13 tends to be actuated in a reverse direction by the ring gear 14. However, due to unidirectional operation of the overrunning clutch 11, torque transmission in the reverse direction may be prevented from occurring so that the armature 5 may be rotated under no load. After starting of the engine, the clutch 11 and the pinion 13 are slid on the rotary shaft 4 towards the left in the drawing under the restoring force of the shift lever, so that the overall device is returned to the position shown in FIG. 1.

Figure 2:
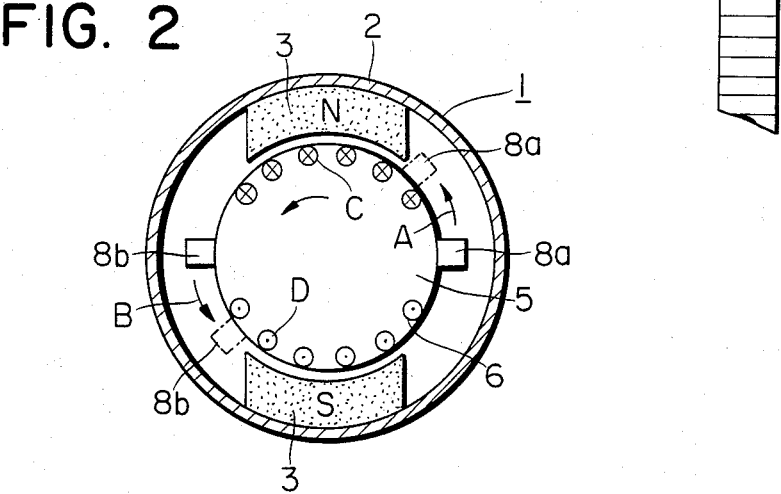
FIG. 2 is a transverse sectional view taken along line II—II of FIG. 1 and illustrates the inventive method of starting the starting electric motor.

FIG. 2 is a longitudinal sectional view taken along line II—II of FIG. 1 and shows the method of starting the starting electric motor according to the present invention. In FIG. 2, the same parts as those shown in FIG. 1 are designated by the same reference numerals.

Referring to FIG. 2, the mounting position of the brush holders 9 on the brush base is adjusted so that, when the current is supplied to the armature winding 6, the slide contact points of the positive and negative brushes 8a, 8b on the commutator 7 are situated on the electrically neutral axis. It should be noted that, prior to meshing of the pinion 13 with the ring gear 14, the positive and negative brushes are biased from the solid-line position to the chain-dotted line position as indicated by arrow marks A, B in FIG. 2 through adjustment of the mounting position of the brush holders 9 relative to the brush base 10.

The method of starting of the electric starting motor is now described. A current C flowing at right angles with and into the plane of the drawing sheet and a current D flowing at right angles with and out of the plane of the drawing sheet are supplied to the armature winding 6 through the positive and negative brushes 8a, 8b situated in the solid line position in FIG. 2 for exciting the armature 5. The state shown in FIG. 2 represents the steady-state operation of the starting D.C. electric motor 1. During the starting of the starting motor 1, the positive and negative brushes 8a, 8b are biased to the chain-dotted line position in FIG. 2. In general, it is theoretically preferred that the slide contact points of the positive and negative brushes 8a, 8b on the commutator 7 be situated on an electrically neutral axis. The more the contact points are offset from this axis, the more the operation of the D.C. motor is deteriorated and the lesser the motor output. Hence, during starting of the starting motor 1, the positive and negative brushes 8a, 8b are shifted away from the electrically neutral axis towards the sides of the poles where the magnetic field is strengthened by the armature-reaction magnetic flux as indicated by the arrow marks A, B. In this manner, the main magnetic field generated by the permanent magnet 3 is not weakened due to the demagnetizing effect brought about by the rush current flowing through the armature winding 6 at the instant the pinion 13 is engaged with the ring gear 14. Thereafter, when the pinion 13 engages with the ring gear 14, the brushes 8a, 8b are returned to their normal positions on the electrically neutral axis so that the starting motor 1 delivers a rated output for starting the associated internal combustion engine.

Figure 3:
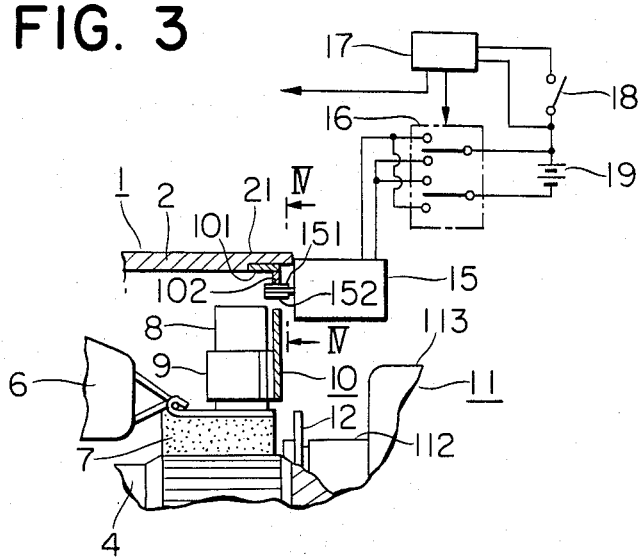
FIG. 3 is a diagrammatic view showing brush shifting means employed in the inventive method of starting the starting electric motor.
Figure 4:
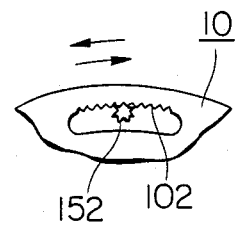
FIG. 4 is a section taken along line N—N of FIG. 3.

Reference is now made to FIGS. 3 and 4 illustrating the manner in which the brushes 8a, 8b are shifted and means for controlling the shifting of the brushes since the time of detection until actual shifting. In the drawing, numeral 1 designates the starting electric motor and the numeral 2 a yoke of the motor. The yoke 2 has a socket or recess 21 in which an outer flange 101 of the brush base 10 which moves with the brush 8 is introduced for loosely rotating relative to the yoke 2. The numeral 102 designates an internal sector gear integrally formed in the brush base and meshes with a pinion 152 formed on an output rotary shaft 151 of a small size D.C. motor 15. Numeral 16 designates a changeover switch for switching the rotational direction of the small size motor 15, and numeral 17 a control unit for controlling the operation of the switch 16. Numeral 18 designates a key switch for sending out activating signals to the starting motor 1 and to the control unit 17. Numeral 19 designates a storage battery.

In operation, when the key switch 18 is turned on, the control unit 17 and hence the switch 16 are activated so that the motor 15 is supplied with exciting current and thereby driven into partial rotation. Thus, torque is transmitted from the pinion 152 to the brush base 10 through sector gear 102. In this manner, the brushes 8a, 8b which move with the brush base 10 are set into partial rotation in the direction of the arrow marks A and B, respectively, as shown in FIG. 2, and are biased to the chain-dotted line positions. This shifting takes place during a time interval as pre-set in a timer, not shown, enclosed in the control unit 17. After the lapse of the pre-set time interval, the voltage of the storage battery 19 is supplied to the brushes 8 under control of the control unit 17. With the brushes 8a, 8b thus biased, the starting motor 1 delivers a controlled output whereby the ring gear 14 is driven through the associated pinion 13. After the pinion 13 engages the ring gear 14, the switch 16 is activated in reverse by the control unit 17 so that a reverse voltage is applied to the motor 15 which is thereby operated in reverse. In this manner, the operation of the brush base 10 is now reversed from that described hereinabove so that the brushes 8a, 8b are returned to their normal positions or solid-line positions shown in FIG. 2. A regular output is produced in this manner by the starting electric motor 11 so that the engine may be urged to start through the pinion 13 and the ring gear.

It is seen from the above that the operation shown in and described hereinabove by referring to FIG. 2 may be realized by annexing a device of a simple design to the existing starting and torque transmission system.

Preferably, the small size D.C. motor 15 is designed as an interval speed reducing type motor so that the increased torque may thereby be supplied for further improving the operational reliablity.

The small-size D.C. motor 15 may also be replaced by a thrust device operating upon a different operating principle, such as solenoid (rotary solenoid).

From foregoing it is apparent that the arrangement of the present invention provides smooth starting characteristics of the starting motor and considerable reduction in the wear or damage to the pinion or the associated starting ring gear.

What is claimed is:

1. A method for starting an electric motor designed for starting an internal combustion engine having a ring gear, said electric motor comprising a cylindrical yoke, a permanent magnet secured to the inner peripheral surface of said cylindrical yoke, an armature having a rotary output shaft and an armature winding and mounted in said yoke in a relation facing said permanent magnet, a commutator mounted to said rotary output shaft of the armature and connected to said armature winding, and brush means slidingly contacted with the outer peripheral surface of said commutator and supplying current to said armature winding, an overrunning clutch, said output shaft having a helically splined portion splinedly connected with said overrunning clutch, a pinion carried by said output shaft and rotationally coupled to said overrunning clutch only in one direction of rotation of said output shaft, said pinion engaging said ring gear of the internal combustion engine when said clutch is shifted towards an end of said output shaft, said method comprising, until the time said pinion meshes with said ring gear, shifting said brush means away from a neutral axis towards pole sides of the permanent magnet where the main magnetic field produced by said permanent magnet is strengthened by armature-reaction magnetic fluxes, and, after said pinion is engaged with said ring gear, returning said brush means again to their positions situated on said neutral axis.

2. The method as claimed in claim 1 wherein said brush means are mounted on brush holders movable by the operation of driving means for changing the brush positions.

3. The method as claimed in claim 2 wherein each of said brush holders has gear means driven by electric motor means.

4. An electric motor for starting an internal combustion engine having a ring gear, said electric motor comprising a cylindrical yoke, a permanent magnet secured to the inner peripheral surface of said cylindrical yoke, an armature having a rotary output shaft and an armature winding and mounted in said yoke in a relation facing said permanent magnet, a commutator mounted to said rotary output shaft of the armature and connected to said armature winding, brush means slidingly connected with the outer peripheral surface of said commutator and supplying current to said armature winding, an overrunning clutch, said output shaft having a helically splined portion splinedly connected with said overrunning clutch, a first pinion carried by said output shaft and rotationally coupled to said overrunning clutch only in one direction of rotation of said output shaft, said pinion engaging said ring gear of the internal combustion engine when said clutch is shifted towards an end of said output shaft, a sector gear formed in a brush base secured to said brush means, said sector gear being an internal gear, a D.C. motor having a main output shaft, a second pinion formed on said main output shaft of said D.C. motor, said second pinion engaging said sector gear, a changeover switch for switching between normal and reverse operations of said D.C. motor, control means for said changeover switch, a key switch for initiating the operation of said control means, and a battery for supplying current through a closed electrical circuit formed by said D.C. motor, changeover switch, control means and by said key switch, whereby, until the time said first pinion meshes with said ring gear, said brush means are shifted by said control means and the D.C. motor away from said neutral axis towards the sides of the poles of the permanent magnet where the main magnetic field produced by said permanent magnet is strengthened by the armature-reaction magnetic fluxes for delivering a controlled output to said first pinion and said ring gear, and, after said first pinion is engaged with said ring gear, said brush means are returned to their positions situated on said neutral axis through operation of said control means, changeover switch and said D.C. motor.

* * * * *